Oct. 21, 1952 E. N. HEINZ, SR 2,614,751
UNEXPIRED TIME AND MATURITY DATE CALCULATOR
Filed Jan. 10, 1950
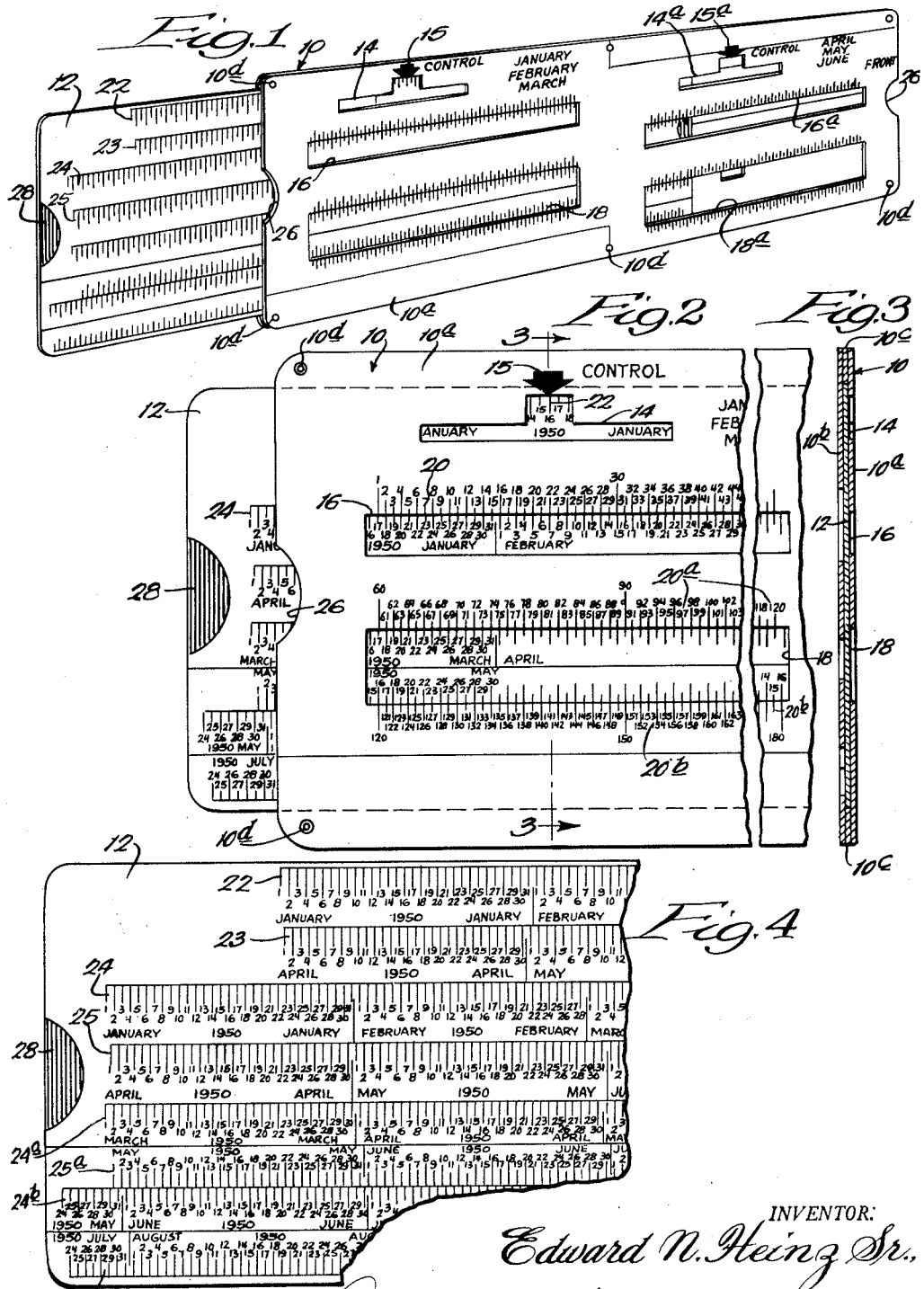
INVENTOR:
Edward N. Heinz Sr.,
BY Dawson, Cones, Booth and Spangenberg,
ATTORNEYS.

Patented Oct. 21, 1952

2,614,751

UNITED STATES PATENT OFFICE 2,614,751

UNEXPIRED TIME AND MATURITY DATE CALCULATOR

Edward N. Heinz, Sr., Oak Park, Ill.

Application January 10, 1950, Serial No. 137,827

3 Claims. (Cl. 235—89)

My invention relates to an improved calculator to determine the unexpired time of a note or other document and the legal maturity date therefor.

It is frequently necessary to determine the unexpired time between two calendar dates and the appropriateness of the later date as a maturity date. For example, in transactions involving thirty-day, ninety-day, or similar notes it is common practice to discount the note on the basis of its maturity date. This demands a determination of the number of days before the maturity date and, in addition, requires that the maturity date be checked to assure that it is not a Saturday, Sunday, or other legal holiday when payments cannot be made.

These computations must be made both accurately and rapidly by bank clerks and others required to make them. Such rapid and accurate computations are difficult, however, because each month has a different number of days and subtractions are required in each case to compute the days to the end of the month. Moreover, on leap years February has an extra day. Furthermore, there is no way to ascertain that a specific date is a holiday without recourse to a calendar unless that date happens to be July 4 or another of the very few legal holidays known by calendar date.

In accordance with the present invention an improved calculator for unexpired time is provided. This calculator automatically takes into account the varying number of days per month and the additional day in February during leap year and indicates immediately whether the designated maturity date can be used as a legal maturity date.

In addition to providing the desired simple time calculation, the apparatus of the present invention provides a highly useful inexpensive advertising device. The outer jacket or body defines useful spaces for advertising matter. Each time a new insert or slide member is required, the member can be supplied to each user and may bear additional advertising matter. Thus the advertiser not only obtains the benefit of the permanent and continuous advertising on the body of the calculator but, in addition, "punch" is provided at uniform time intervals when the slide member or insert bearing the additional advertising is received by the user.

The calculator of the present invention has the further advantage of ease of construction from cardboard or similar inexpensive material that can directly receive printing.

It is therefore a general object of the present invention to provide an improved calculator for time intervals that takes into account the variations in the lengths of months and does not require any computation on the part of the user.

Another object of the present invention is to provide an improved time calculator capable of bearing advertising matter and having a replaceable slide that is replaced at predetermined time intervals and is capable of bearing additional advertising matter.

Still another object of the present invention is to provide an improved time calculator that can readily be made of cardboard or the like.

The novel features which I believe to be characteristic of my invention are set forth with particularity in the appended claims. My invention itself, however, both as to its organization and method of operation, may best be understood by reference to the following description, taken in connection with the accompanying drawings, in which:

Figure 1 is a view in perspective of a calculator constructed in accordance with the principles of the present invention;

Figure 2 is a fragmentary enlarged elevational view of the calculator of Figure 1;

Figure 3 is a cross-sectional view through axis 3—3, Figure 2; and,

Figure 4 is an enlarged fragmentary elevational view of the portion of the slide or movable member cooperative with the portion of the frame or casing shown in Figure 2.

Referring now to the figures, there is shown at 10 the frame or body defining a longitudinal slot or opening to receive the movable slide or insert 12. As seen best in Figure 3, the frame or body 10 is defined by a pair of spaced cardboard sheets, 10a and 10b, separated by the spacers 10c. Suitable rivets 10d extend through the cardboard sheets and separators to secure the assembly in place. The slide 12 is defined by a single cardboard sheet of size to fit in and slide within the longitudinal opening defined by the frame or body 10.

The cardboard sheets 10a and 10b each have a plurality of windows extending longitudinally of the frame they define. Two of these windows, 14 and 14a, are control windows. The edge of the sheet 10a is marked with suitable arrows or index lines 15 and 15a facing the edges of these windows to register with suitable scales marked on the slide 12. A pair of response windows is associated with each of the control windows 14 and 14a. The response windows associated with control window 14 are indicated at 16 and 18 and the response windows associated with the control window 14a are indicated at 16a and 18a. The sheet 10a is marked with suitable scales along the edges of these windows as described in further detail hereafter.

As seen best in Figure 2, the upper edge of the window 16 is marked with a scale 20 having uniformly spaced gradations increasing from the numeral 2. In the particular embodiment shown, the last gradation on this scale is 60. The upper edge of the window 18 is provided with a like set of uniformly spaced gradations 20a having the same spacing as the spacing of the gradations on scale 20. These gradations extend from the number 60 to the number 120 as shown. Similar gradations are provided on the lower edge of the window 18 to form the scale 20b. These are spaced uniformly with the same spacing as the gradations of scales 20a and 20b and are numbered from 120 to 180.

The slide 12 has a scale in mating relation with each of the above-mentioned scales. Each of these scales is marked with uniformly spaced gradations spaced by the same distance as the spacing of the gradations on scales 20, 20a, and 20b. The scale on slide 12 in registry with the control window 14 and the arrow 15 is indicated at 22. The markings on this scale are best seen in Figure 4. As shown, the scale is divided into sections, one for each month and the numbers for each month run consecutively from unity for the first day of the month to the last day of the month. Suitable markings indicate the month and year involved. Thus, since January, 1950, has 31 days, the numbers on scales 22 extend from 1 to 31, at which point the February scale, beginning with 1, starts.

A scale 24 like scale 22 is provided to register with the gradations 20 marked on the upper edge of the window 16. As shown, scale 24 is divided into months just as scale 22 and the number of gradations in each month corresponds to the number of days in that month.

The scale 24 is positioned longitudinally of the slide 12 so that the gradation marked "January 2" registers with the indication "1" appearing on the scale 20 when the control arrow 15 registers with the "January 1" marking on the scale 22. In other words, the number indicated by the date "January 2" on the scale 24 is "2" when the control arrow 15 registers with the date "January 2" on the scale 22.

The foregoing condition is achieved by offsetting scales 24 and 20 relative to each other by one unit as compared to the relation of the arrow 15 and the scale 22. This may be seen in Figure 2 where the control arrow 15 is aligned with the date "January 16" while the numeral "1" on the scale 20 is aligned with the date January 17."

From the foregoing it will be apparent that the date corresponding to any given number of days from the date indicated by the arrow 15 may be read directly from the scale 24. With reference to Figure 2, for example, the date of one day after January 16 is January 17, as indicated opposite the numeral 1 of the scale 20. Similarly 10 days after January 16 is the day of January 26. If the date of 30 days past January 16 is desired, it can be read directly from scale 24 opposite the indication "30" on the scale 20. This date is February 15 as indicated.

If it is desired to know the calendar date of the 120th day following January 16, 1950, this date can be read from the slide marking in registry with the mark "120" on the scale 20b. This date is May 16, 1950.

It will be observed that the reading of the date is direct and requires no additions or subtractions and, moreover, it is unnecessary for the user to consider the number of days in the months involved, or whether a given year is leap year.

The scales 20a, 20b, 24a and 24b extend the range of the time indication associated with the control window 14. As shown, scale 20a extends from day 60 to day 120 and the scale 20b extends from day 120 to day 180, thus giving a maximum computation of 180 days from the initial date set on the control window 14.

The scales 20a and 24a and the scales 20b and 24b are offset relative to each other to achieve the same direct reading as is obtained with the scales 20 and 24. That is, the 60th day following the date set on window 14 is read directly at the left hand end of the scale 20a and the 120th day after the date set on the window 14 is read directly at the left hand end of the scale 20b.

The scale 22 is marked off for a three-month time period, such as January, February, and March. The scales associated with windows 16 and 18 encompass like periods so that the longitudinal length of the frame 10 required for these scales is substantially the same as the longitudinal length of the slide 12 required for the scale 22.

By thus marking the scale 22 in one three-month time period and the scales 20, 20a, and 20b in successive three-month time periods, the calculator is made capable of computing the calendar dates up to 180 days beyond the date set in the control window. Yet the slide movement is only the length of the scale 22. Consequently, the slide 12 is never required to move more than about half way out of the frame 10.

The feature of requiring only limited movement of the slide 12 is of definite advantage to the user of the calculator for it avoids the mechanical disadvantages associated with motion of the slide to an extended position. Calculators of the type of the present invention are most effectively made of cardboard or other relatively inexpensive light weight material but this material is subject to the disadvantage that precise mechanical fits cannot be obtained. Moreover, it is time consuming for the user of the calculator to shift the slide to a greatly extended position.

The windows 16a and 18a cooperate with the control window 14a in the same manner as windows 16 and 18 cooperate with the control window 14. All are marked with corresponding scales or marks. The slide 12 has a series of scales 23, 25, 25a and 25b that cooperate with the scales formed on the edges of windows 16a and 18a and the pointer 15a. As shown in Figure 4, these scales are marked off in calendar days just as are scales 22, 24, 25a and 25b except that the calendar dates are advanced three months from the corresponding dates of the scales 22, 24, 24a and 24b.

The windows 14a, 16a, and 18a and the cooperating slide and frame scales form a computer just like that of windows 14, 16, and 18 except that it is capable of computing for 180 day periods following the three-month period marked on scale 22.

Thus the front side of the calculator (seen in Figure 1) permits direct determination of the calendar dates for any time period up to 180 days following any preselected date in a six-month time interval.

Preferably the back side of the frame 10 and the back side of the slide 12 are formed and marked to define an additional calculator for the succeeding or preceding six-month time period. To do this, it is merely necessary to repeat the windows and scales on the front sides of these units and to mark the calendar dates advanced by six months.

The frame 10 is cut out at 26 to define end openings to receive the fingers of the user when the slide 12 is moved from the central position. Black circles 28 cooperate with these openings and prevent the finger marks otherwise associated with handling of the slide.

From the foregoing description it will be evident that I have provided an improved time calculator capable of directly determining the calendar date up to 180 days following any selected date in a full year time period. The calculator is easy and simple to operate and is particularly suitable for inexpensive construction, such as cardboard. Moreover, the frame of the calculator and the slide both have room for advertising messages.

The dates of Saturdays, Sundays and other legal holidays are indicated in red or other special distinguishing indicia on the slide 12. This permits instant determination by the user of whether the designated maturity date is a legal holiday, in which case the next business day can be chosen. This check is automatic since the user of the calculator of the present invention must refer to these dates in the use of the instrument and consequently cannot fail to note that fact if the date in question does happen to fall on a legal holiday.

In the appended claims I have used the term "complementary" to designate scales having gradations with the same spacing and marked with similar units.

While I have shown and described a specific embodiment of my invention, it will of course be understood that I do not wish to be limited thereto and that by the appended claims I intend to cover all such modifications and alternative constructions falling within the true spirit and scope of my invention.

What I claim as new and desire to secure by Letters Patent of the United States is:

1. A calculator to determine the time units elapsed between a first date and a second date comprising in combination, a frame having a slide opening and a slide shiftable received in said opening, said frame having a control window and a response window, an index mark on the edge of the control window, an elapsed time scale in uniform successive units spaced in the direction of movement of the slide and extending along the edge of the response window, said slide having an identical pair of time scales complementary to said last scale, one being in registering relation with the index mark on the control window and the other being in registering relation with said last scale, the pair of scales being offset in the direction of motion of the slide to cause the unit mark on the response window to register with the mark on the elapsed time scale corresponding to the time unit following the time unit registered with the index mark, at least one of said pair of scales on said slide bearing special distinguishing indicia for Sundays and legal holidays.

2. An elapsed time calculator for two calendar periods comprising in combination a frame having a slide opening and a slide shiftably received in said opening, said frame having a pair of control windows spaced transversely of the direction of movement of the slide and each bearing an index mark on one edge, said frame further having a pair of response windows spaced transversely of the direction of movement of the slide and each having a straight edge extending in the direction of movement of the slide and having an elapsed time scale in uniform successive units spaced in the direction of movement of the slide, said slide having four time scales one registrable with each of said windows, the scales simultaneously registrable with each control window and its associated response window being identical with each other and complementary with the scale on the response window, each scale associated with a response window being offset relative to the scale for the associated control window to cause the unit mark on the response window to register with the mark on the elapsed time scale corresponding to the time unit following the time unit registered with the index mark, all of said time scales on said slide bearing special distinguishing indicia for Sundays and legal holidays.

3. A calendar date calculator particularly suitable for construction of carboard or the like comprising a frame defining a slide opening, said frame having windows defining three longitudinally extending edges to receive scales, an index mark on the first of said edges, a first scale of uniformly spaced graduations on the second of said edges and marked in successive units, a second scale like said first scale and transversely aligned therewith on the third of said edges, said last scale being marked in successive units extending from the last unit marked on said first scale, a slide received in said opening and bearing a calendar date scale cooperative with each of said edges, said scales being marked off in gradations of the same spacing as the graduations of the first and second scales and marked in accord with successive calendar dates, the scale cooperating with said index mark being substantially identical to said first scale, all of said scales on said slide bearing special distinguishing indicia for Sundays and legal holidays, the scales cooperating with said first scale and said second scale being offset one unit relative to said last scale, to display directly the elapsed time corresponding to each indication on said first scale and said second scale, after a selected date on said last scale has been aligned with said index mark.

EDWARD N. HEINZ, Sr.

REFERENCES CITED

The following references are of record in the file of this patent:

UNITED STATES PATENTS

| Number | Name | Date |
|---|---|---|
| 1,201,205 | Legg | Oct. 10, 1916 |
| 1,520,105 | Bicknell | Dec. 23, 1924 |

FOREIGN PATENTS

| Number | Country | Date |
|---|---|---|
| 294,121 | Great Britain | Mar. 28, 1929 |

OTHER REFERENCES

"Special Slide Rules" by J. N. Arnold; published by Purdue University at La Fayette, Ind.; September 1933; pages 19–25.

"General Electric Review"; published at Schenectady, New York; December 1948; page 50.